United States Patent
Xu (10) Patent No.: US 10,224,034 B2
(45) Date of Patent: Mar. 5, 2019

(54) VOICE RECOGNITION SYSTEM AND CONSTRUCTION METHOD THEREOF

(71) Applicant: Hua Xu, Yiwu (CN)

(72) Inventor: Hua Xu, Yiwu (CN)

( * ) Notice: Subject to any disclaimer, the term of this patent is extended or adjusted under 35 U.S.C. 154(b) by 0 days.

(21) Appl. No.: 15/911,114

(22) Filed: Mar. 3, 2018

(65) Prior Publication Data

US 2018/0190292 A1 Jul. 5, 2018

Related U.S. Application Data

(63) Continuation-in-part of application No. 14/909,741, filed on Feb. 3, 2016, now Pat. No. 9,953,639.

(51) Int. Cl.
| | |
|---|---|
| *G10L 15/00* | (2013.01) |
| *G10L 15/22* | (2006.01) |
| *G10L 25/51* | (2013.01) |
| *G10L 15/18* | (2013.01) |
| *G10L 15/28* | (2013.01) |

(52) U.S. Cl.
CPC .......... *G10L 15/22* (2013.01); *G10L 15/1815* (2013.01); *G10L 25/51* (2013.01); *G10L 15/28* (2013.01); *G10L 2015/223* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 6,631,346 | B1 * | 10/2003 | Karaorman | ......... G10L 15/1822 704/275 |
| 6,714,941 | B1 * | 3/2004 | Lerman | ............. G06F 17/30864 |
| 8,892,420 | B2 * | 11/2014 | Sun | ..................... G06F 17/2785 704/9 |
| 9,953,639 | B2 * | 4/2018 | Xu | ...................... G10L 15/1815 |
| 2013/0268260 | A1 * | 10/2013 | Lundberg | ................ G06F 17/28 704/8 |
| 2015/0255064 | A1 * | 9/2015 | Fujii | ................... G06F 17/2755 704/257 |

\* cited by examiner

*Primary Examiner* — Jesse S Pullias (57) ABSTRACT

Disclosed are a voice recognition system and a construction method for the voice recognition system. By way of layering the system, a general semantic recognition operation for the system is separated from a specific semantic recognition operation for an application program; and by way of classifying the application programs and abstracting out a common performance function, the system can find the application program matching the voice content semantics very efficiently and a third-party program is easily added into the existing voice recognition system. The present invention maps many performance functions to a preset expression with semantic variables, so that the system can recognize more semantic expression manners with optimization of the semantic recognition. Therefore, the system can show more humanized characteristics.

15 Claims, 5 Drawing Sheets

VOICE RECOGNITION SYSTEM AND CONSTRUCTION METHOD THEREOF

CROSS-REFERENCE TO RELATED APPLICATION

The present application is a continuation-in-part of U.S. patent application Ser. No. 14/909,741, filed on Feb. 3, 2016, which is incorporated by reference in its entirety.

BACKGROUND

Field of Invention

The present disclosure generally relates to the field of voice recognition technology, in particular to a distributed voice recognition system and a construction method.

Description of Prior Art

Traditionally a voice recognition system provides voice recognition for input voice through a voice recognition module in a client or a cloud server, and the semantic recognition process is based on a pre-established syntax analysis tree to identify the speech content and call a corresponding application program to complete the operation, such as SIRI, GOOGLE NOW.

The traditional voice recognition system described above intends to establish a general system that can fully understand people's intention. The execution of the identified operations generally occurs in a pre-established speech recognition system database or application. This approach can better control the scope of the operation of the semantic recognition and make the semantic recognition more close to people's understanding of speech. But there are a large number of third party applications on the system, this approach makes it impossible to perform operations against third party applications, even if these operations have been identified by the system. At the same time, the user is concerned about the different sites, because of the different data sources, the results from the same search requests are also different. In addition, in order to allow the third-party application to use the speech recognition function, a simple speech recognition module needs to be added or a cloud voice development library of the third-party needs to be applied, and then preset expressions and corresponding operations are uploaded to the semantic recognition library. In this way, the semantic recognition database of the third party cannot be found by other programs, and the operation can only occur in the third party application or database.

SUMMARY

In order to solve the above technical problems, the present invention provides a voice recognition system, comprising:

a registration center storing information of application programs installed on the speech recognition system, the registration center comprises:

class nodes classified by intent, each class node stores preset expressions with semantic variables which describe common behaviors of a series of the application programs, these preset expressions are mapped to a public function set;

wherein, the speech recognition system further comprises:

application programs, which are third-party applications downloaded from an application store, each of the application programs joins the registration center by declaring one class node to which it belongs and inheriting the public function set of the class node;

a voice recognition module, which converts voice content into text content, the speech recognition system selects a corresponding application according to the text content obtained from the voice recognition module to process information obtained from the text content;

Wherein, when the text content output by the voice recognition module matches with a preset expression with semantic variables of a class node in the registration center, the speech recognition system extracts all valuable semantic information from the text content, then the speech recognition system selects one application belonging to the matching class node and writes an intent name and intent variables into a private directory of the selected application, then after the selected application is started, the selected application selects and executes a public function inherited from the matching class node based on the intent name and variables; wherein the intent name is bound to the matching preset expression and corresponds to a constant in the public function inherited from the matching class node, and the intent variables are extracted from the text content output by the voice recognition module and correspond to variables in the public function inherited from the matching class node.

Preferably, the information each of the application programs submits to the registration center further comprises a name and an identifier of each of the application programs.

The identifier of the application program points to a detailed address of a system directory where a start program of the application program is located. The speech recognition system starts the application program by opening the system directory that the identifier of the application program points to.

In other embodiments, a location of the application's private directory is marked by the identifier of the application program. The name of the private directory is automatically generated by the system in light of the name of the application program because the private directory and the start program are stored in the same directory of the system. The data written into the private directory can be saved in XML format to facilitate to be accessed by the application program.

Preferably, when the text content output by the voice recognition module matches with a preset expression with semantic variables of a matching class node in the registration center, manners in which the system selects the application program include one or more of the following methods:

(i) when the matching preset expression with semantic variables specifies an application name, the speech recognition system selects the application based on the application name;

(ii) When the matching preset expression cannot choose the application program according to an application name, if there is only one application belonging to the matching class node in the current system, the application will be selected as a default application;

(iii) when the matching preset expression with semantic variables does not specify an application name, the speech recognition system selects all the applications that belong to the matching class node, and the results returned by all the applications are returned to the speech recognition system and displayed on the system preset interface;

(iv) when the matching preset expression with semantic variables does not specify an application name, the system randomly selects one application belonging to the matching class node;

(v) each of the applications has a priority, when the matching preset expression with semantic variables does not specify an application name, the system selects one application that belongs to the matching class node with the highest priority; wherein, manners of setting the priority of the applications may include one or more of the following ways:

First, users configure the priority of an application autonomously in the system settings interface;

Second, depending on the number of times an application is opened, the application that is most frequently used is set to the highest priority;

Third, the priority is set according to the place where the application is used. The system records the location information when the application is opened. The application that is opened most frequently in an area is set to the highest priority in the area.

Preferably, the registration center further comprises application program nodes; and each of the application program nodes represents one of the application programs and stores preset expressions with semantic variables that are not used in the class nodes of the registration center; and the preset expressions are mapped to a specific function set inside the applications, when the text content obtained from the voice recognition module matches a preset expression with semantic variables of a certain application node, the application represented by this application node is started by the system to call the specific function to which the matching preset expression is mapped according to the incoming intent name and intent variables. The specific function call to which an application node is mapped can be either a public function inherited from a class node or an application-specific function call.

Preferably, the registration center further comprises application program internal nodes; and each of the application program internal nodes stores preset expressions with semantic variables that are used in one application and corresponding function calls, after entering the selected application, the speech recognition system processes the user's voice input in the following manner:

The voice recognition module converts voice into text form, the speech recognition system validates whether the obtained text content matches with the preset expressions with semantic variables of one of the application internal nodes, if they match, the voice recognition system executes a corresponding function call of the application program internal nodes; otherwise, the obtained text content is passed to all the class nodes, if the obtained text content matches with a preset expression with semantic variables of a class node, the speech recognition system selects an application that belongs to the class node to be started and passes an intent name and intent variables to the selected application, the selected application calls a public function inherited from the matching class node based on the incoming intent name after it's started, wherein, the intent name is bound to the matching preset expression and corresponds to a constant in the public function inherited from the matching class node, and the intent variables are extracted from the text content output by the voice recognition module and correspond to variables in the public function inherited from the matching class node. The preset expressions of the application program internal nodes can be provided by the application developers or automatically generated by the system.

The variables of each preset expression are semantic variables, which are mainly used to determine whether given variables are within a specified semantic scope or not. Among the semantic variables, the semantic scope can be derived from common sense, and can also be a name set of the third-party application programs installed on the system. If the specified semantic scope is relatively small, it can be given by enumeration. The system constructs the syntax analysis tree by the preset expressions to complete the semantic recognition of the input speech content, and each preset expression corresponds to a function call. After determining a grammatical structure that can be parsed correctly, a plurality of linguistic expressions for this grammatical structure will be added together as the semantic recognition database updates. Corresponding preset expressions of the new added linguistic expressions will be mapped to a same function, thus establishing a more humane semantic recognition database, also help to improve the accuracy of voice recognition.

In order to prevent the function name of the application program and the function name of the class node conflict, application's unique functions will not be allowed to use the public function name of the class node.

In another embodiment, the preset expressions can have no semantic variables, which can be seen as values of the semantic variables of the preset expressions are null.

In another embodiment, the value of the semantic variables of the preset expressions can be set to "*", it means this variable can match any input text. For example, in chatting scenes, a preset expression can be described as "Use<appName> to say <*>", "*" represents what you are going to say. So you can say "Use <Facebook> to say I will go home tomorrow." This sentence will match the preset expression described above.

In another aspect, another aspect of the subject matter described in this specification can be implemented in a method of constructing a speech recognition system. The speech recognition system comprises a voice recognition module and a registration center, the registration center is configured to store information of applications installed in the speech recognition system, the applications are third-party applications downloaded from an application store, the registration center comprises: class nodes classified by intent, each class node stores preset expressions with semantic variables which describe common behaviors of a series of the application programs, these preset expressions are mapped to a public function set; wherein the construction method comprising:

S701, each of the applications belonging to one class node and inheriting the public function set of the class node submits information to the registration center;

S702, the speech recognition system receives voice input by a user, and the voice recognition module converts voice into text form;

S703, the text content obtained from the speech recognition module is transferred to all the class nodes. If the text content matches with a preset expression with semantic variables of one class node in the registration center, S704 is executed.

S704: the speech recognition system selecting one application and writing an intent name and intent variables corresponding to the matching preset expression with semantic variables into a private directory of the selected application program installed on the system after the speech recognition system extracting all valuable semantic information from the text content, wherein, the intent name is bound to the matching preset expression and corresponds to a constant in a public function inherited from the matching class node, and the intent variables are extracted from the text content output by the voice recognition module and correspond to variables in the public function inherited from the matching class node;

S705: the system starting the selected application program, wherein the speech recognition system determines whether the private directory of the selected application program has the intent name and corresponding intent variables or not before loading the selected application program, and wherein if the private directory of the selected application program has the intent name and corresponding intent variables, the selected application program loads the intent name and corresponding intent variables from the private directory and calls the public function inherited from the matching class node; and wherein if the private directory of the selected application program has no the intent name and corresponding intent variables, a default initial page will be loaded (it means that the application will be loaded by default)

Preferably, the submitted information in step S701 comprises a name and an identifier of the application program, class information of the application program.

The identifier of the application program points to a detailed address of a system directory where a start program of the application program is located. The speech recognition system starts the application program by opening the system directory that the identifier of the application program points to.

Preferably, manners for selecting the selected application in step S704 include one or more of the following methods:

(i) when the matching preset expression with semantic variables specifies an application name, the speech recognition system selects the selected application based on the application name;

(ii) when the matching preset expression cannot choose the selected application program according to the application name, if there is only one application belonging to the matching class node in the current system, the application is selected as a default application;

(iii) when the matching preset expression with semantic variables does not specify an application name, the speech recognition system selects all the applications that belong to the matching class node, and the results returned by all the applications are returned to the speech recognition system and displayed on the system preset interface;

(iv) when the matching preset expression with semantic variables does not specify an application name, the speech recognition system randomly selects an application belonging to the matching class node;

(v) The application has a priority, when the matching preset expression with semantic variables does not specify an application name, the speech recognition system selects an application that belongs to the matching class node with the highest priority;

Preferably, the registration center further comprising: application program internal nodes; wherein each of the application program internal nodes stores preset expressions with semantic variables that are used in one application and corresponding function calls. After entering the selected application program in step S705, the speech recognition system processes the user's voice input in the following manner:

the voice recognition module converting voice into text form, the speech recognition system validates whether the obtained text content matches with a preset expressions with semantic variables of one of the application internal nodes, wherein if they match, the speech recognition system executes a corresponding function call, otherwise the obtained text content is passed to all the class nodes, if the obtained text content matches with a certain preset expression with semantic variables of a class node, the speech recognition system selects an application to be started and passes an intent name and intent variables corresponding to the matching preset expression with semantic variables to the selected application, the selected application calls a public function inherited from the matching class node based on the incoming intent name after it's started.

In another aspect, the subject matter described in this specification can be a speech recognition system for the third party applications. The speech recognition system comprising:

a voice recognition module, which convert voice content into text form; applications, third-party applications downloaded from an application store which join the voice speech recognition system by declaring one class node to which it belongs and inheriting the public function set of the class node; wherein the class nodes are classified by intent, each class node stores a plurality of preset expressions with semantic variables that describe common behaviors of a series of application programs, and these preset expressions are mapped to a public function set, wherein each of the preset expressions of class nodes specifies an application to be launched according to an application name, manners in which the application interact with the user through the speech recognition system include:

After the voice input by the user is converted into text form by the voice recognition module, when the obtained text content matches with a preset expression with semantic variables of one class node, the system selects an application according to the application name and writes an intent name and corresponding intent variables into the selected application's private directory after the speech recognition system extracts all valuable semantic information from the text content, then starts the selected application, the speech recognition system determines whether the private directory of the selected application program has the intent name and corresponding intent variables or not before loading the selected application program, and wherein if the private directory of the selected application program has the intent name and corresponding intent variables, the selected application program loads the intent name and corresponding intent variables from the private directory and calls a public function inherited from the matching class node; and wherein if the private directory of the selected application program has no the intent name and corresponding intent variables, a default initial page is loaded (it means that the application will be loaded by default), wherein, the intent name is bound to the matching preset expression and corresponds to a constant in the public function inherited from the matching class node, and the intent variables are extracted from the text content output by the voice recognition module and correspond to variables in the public function inherited from the matching class node.

Preferably, manners in which the applications interact with the user through the voice recognition system further includes:

After the voice input by the user is converted into the text form by the voice recognition module, when the obtained text content matches with a preset expression with semantic variables specific to an application program, the application program is selected and passed into a corresponding intent name and intent variables, it will call the corresponding function according to the incoming intent name and intent variables after the application is started.

Preferably, after the application is started, the manners in which the applications interact with the user through the speech recognition system further include:

After the voice input by the user is converted into text content by the voice recognition module, the application program executes a corresponding function call if the text content matches with a preset expression with semantic variables used in the application.

The beneficial effects of the present invention are:

The present invention classifies the application program according to intention, and presets the expressions for each class by the speech recognition system, and these expressions are eventually mapped to a public function set. The application joins the speech recognition system by declaring a class node to which it belongs and inheriting the public function set of the class node. With the optimization of the speech recognition system, the system can identify more expressions, and the new expressions will be mapped to the existing public function set. The solution makes application developers do not need to actively adapt to these newly added expressions, but only focus on providing personalized services for users. This approach improves the efficiency of user interaction without placing an extra burden on third-party application developers. At the same time, the system generates personalized representations for third-party applications based on parameters provided by third-party applications, which increases the diversity of voice interfaces.

BRIEF DESCRIPTION OF DRAWINGS

The detailed description of the present invention is as following by combination of drawings and detailed description.

DETAILED DESCRIPTION

Figure 1:
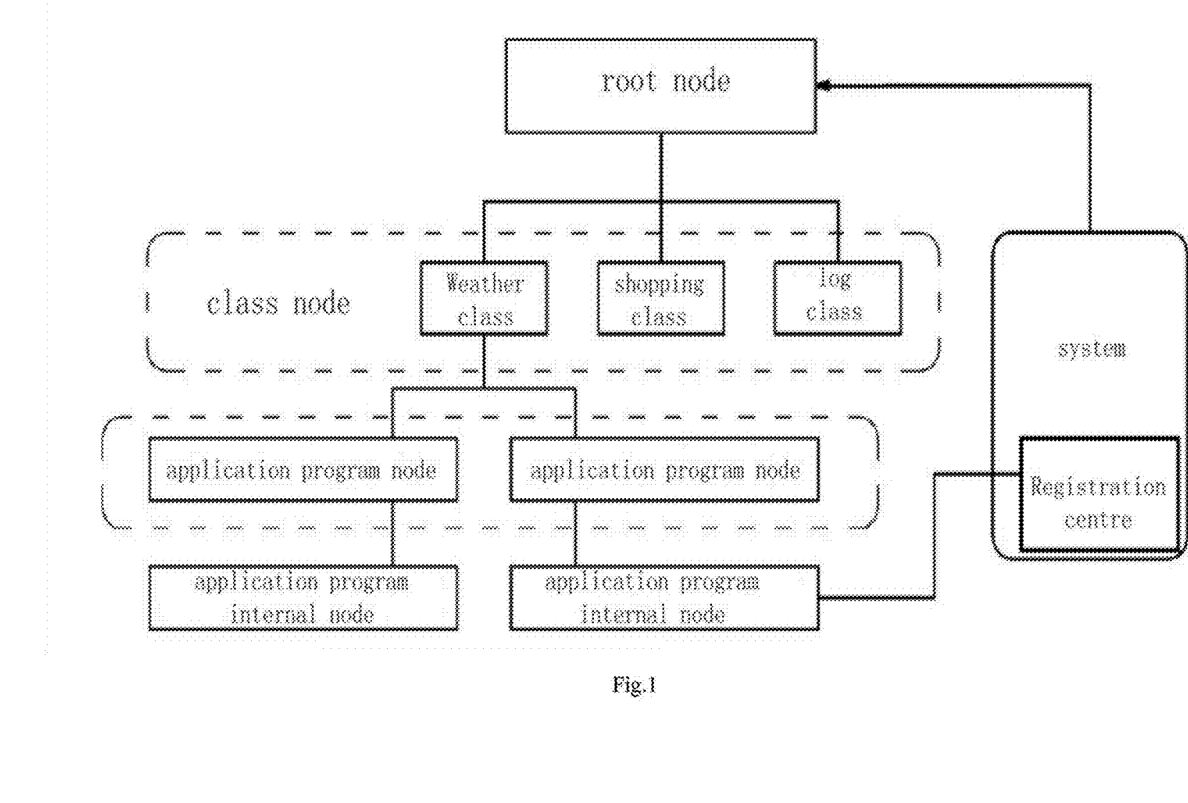
FIG. 1 is schematic diagram of a system of a registration center of the present invention.
Figure 2:
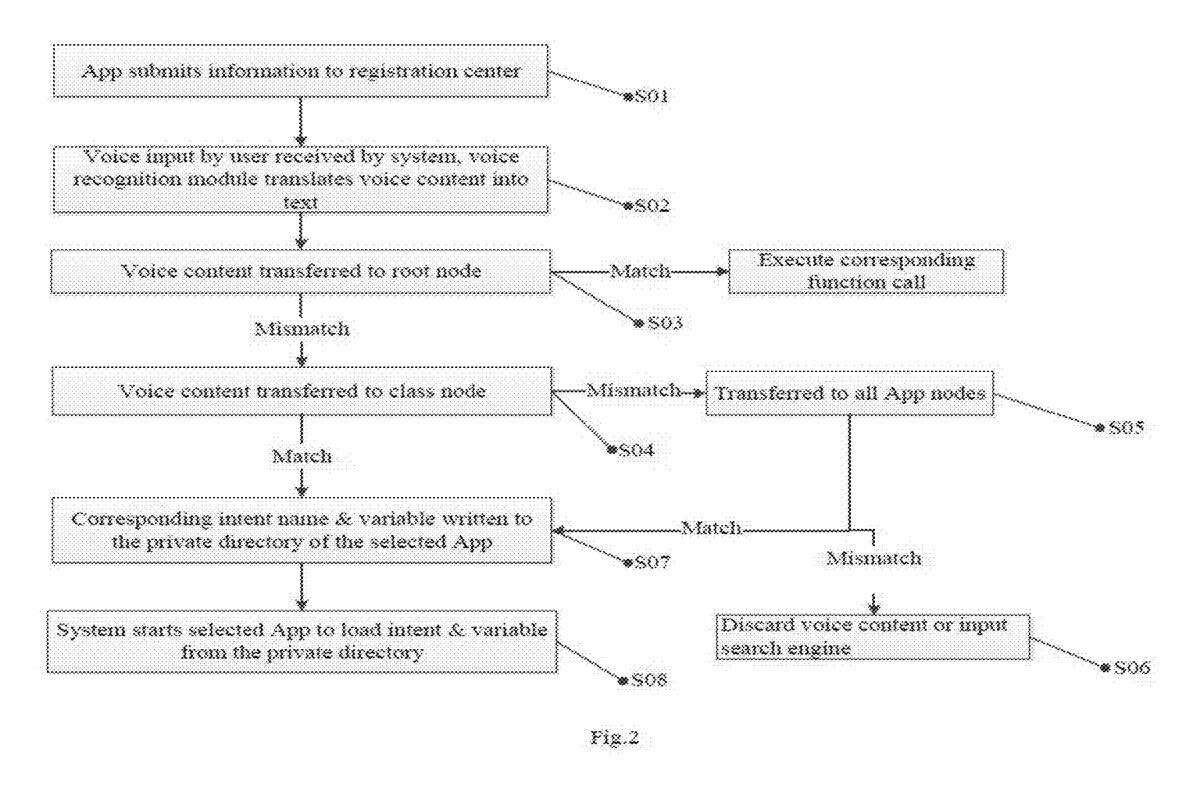
FIG. 2 is a flowchart of a method for processing voice input.

This article generally describes a speech recognition system that is deeply integrated with third-party applications. Referring to FIG. 2, when a third-party application program needs to be added to the speech recognition system, firstly it needs to submit the following information to a registration center of the speech recognition system (S01): A name and an identifier of the application program, the class information of the application program, and a plurality of specific preset expressions with semantic variables and the corresponding functions of the application program nodes and some information from the application program internal nodes. The identifier of the application program points to a detail address of a system directory where a startup program of the application program is located. the speech recognition system starts the application program by opening the system directory that the identifier of the application program points to. The registration center is a multi fork tree including a root node, a plurality of class nodes, a plurality of application program nodes, and a plurality of application program internal nodes (referring to FIG. 1). The root node stores a plurality of preset expressions with semantic variables, to find and open files or application programs that are stored in the speech recognition system. Each class node stores a plurality of preset expressions with semantic variables which are used to describe common behaviors of a series of applications programs, and maps the preset expressions to a public function set. Each application program node belongs to one of the class nodes and inherits a public function set of a class node. Each application program internal node stores a plurality of preset expressions used inside the application program, and a corresponding function set. Only after entering an application program, the system can use the preset expressions of the application program internal node to match voice content. The class nodes in FIG. 1 are classified by intent, and one class node corresponds to a class of preset expressions. For example, a preset expression representing shopping class is "Use <appName> to search <a certain commodity>", and a preset expression representing log class is "Create a note called <noteName> saying <noteContent> on <appName>".

The corresponding operations of the preset expressions of the root node are mainly used to find and open files or application programs or call unique application programs provided by the system (for example, telephony application program, messaging application program). For example, their preset expressions can be set to "opening <appName>", "calling<contact name>", "sending message<contact name>". Each class node is mainly used to locate the class to which the target application is located, in order to quickly find out the location of the application node that performs the operation that is semantically recognized. When the class nodes cannot recognize the semantic meaning of the voice content, the content will be given to all the application nodes for semantic recognition. For security, the voice content from the root node will not be transmitted to the application program internal nodes.

According to information submitted by an application program to the registration center, some information from the new application program is added to an application program node which is a sub node of a class node. Simultaneously, a plurality of specific preset expressions with semantic variables and a corresponding function set of the application program node are also written into the corresponding application program node. The application program internal node is a sub node of the application program node, and it stores a plurality of specific preset expressions with semantic variables and a corresponding function set applied inside the application program.

The variables of each preset expression are semantic variables, which are mainly used to determine whether given variables are within a specified semantic scope or not, wherein the specified semantic scope can be derived from common knowledge, and can also be a name set of the application programs installed on the system. If the specified semantic scope is relatively small, it can be given by enumeration. In a commercial application program, the system can get examples of the semantic variable by machine learning, for example, a plurality of qualifiers are used to describe commodity names. In a chat application program, a local application program submits names in a contact list as a semantic variable to the registration center after the user is connected to a network. The invention constructs the syntax analysis tree by the preset expressions to complete the semantic recognition of the input speech content, and each preset expression corresponds to a function call. After determining a grammatical structure that can be parsed correctly, a plurality of presentations for this grammatical structure will be added together as the semantic recognition database updates. Corresponding preset expressions of the new added linguistic expressions will be mapped to a same function, thus establishing a more humane semantic recognition database, also help to improve the accuracy of voice recognition.

In order to prevent the function name of the application program and the function name of the class node conflict, application's specific functions will not be allowed to use the name of the public function name of the class node.

After the speech recognition system receives voice input by the user, the input voice will be transformed into text format by a voice recognition module (S02). The speech recognition system determines whether the input voice content matches with the preset expressions with semantic variables of the root node or not (S03), when the input voice content matches with the preset expressions with semantic variables of the root node, a corresponding function is called. If the input voice content does not match with the preset expressions with semantic variables of the root node, the input voice content is submitted to the class nodes (S04). When the input voice content does not match with the preset expressions with semantic variables of the class nodes, the input voice content is submitted to all application program nodes to analyze (S05). When the input voice content matches with the preset expressions with semantic variables of one of the application program nodes, the speech recognition system writes an intent name and some intent variables corresponding to the matching preset expression into a private directory of the application program retained by the system (S07), and starts the matching application program. When the voice content exactly matches with the preset expressions of the class nodes, and the matching preset expression does not specify one of the application program nodes to call a function, the system selects a random application program node and writes an intent name and some intent variables corresponding to the matching preset expression into the private directory of the selected application program (S07). Preferably, the user can set the priority of the application program node that is a sub node of the class node. In the case that the application program nodes have the same probability of being selected by the class nodes to call the function corresponding to the preset expressions, a higher priority application program will be called by the speech recognition system. Finally, if the preset expressions with semantic variables of all nodes do not match with the input voice content, the input voice content is discarded or sent to a public search engine for a wider range of search (S06).

The system starts the selected application program, and will determine whether the private directory of the selected application program has an intent name with corresponding intent variables or not before loading the application program, wherein if the private directory of the selected application program has an intent name with corresponding intent variables, the application program will get the intent name with intent variables from the private directory, and calls a corresponding function. If the private directory of the selected application program has not any intent information, the application program will load a default initial page (S08). In order to facilitate access to services that are bound to an account, the user can enter an account name and password of the application program in advance and save the account name and password in the private directory of the application program set by the speech recognition system. At the same time, a specific return interface can be set up for each function call inside the application program, in order to return the results of the call to the user, and guides the user to the application program internal node.

After starting the selected application program, firstly the voice content input by the user is converted into text format, after that the speech recognition system determines whether the text content matches with a preset expressions of the application program internal node or not. When the voice content matches with a preset expressions of one application program internal node, a corresponding function will be called. When the text content does not match with the preset expressions of the application program internal node, the text content is submitted to all class nodes and all application program nodes in the registration center. If the text content matches with a preset expressions of a class node or an application node, an intent name and intent variables corresponding to the matching preset expression are written into a private directory of the selected application program, and the selected application programs are started to perform a corresponding function call.

Figure 3:
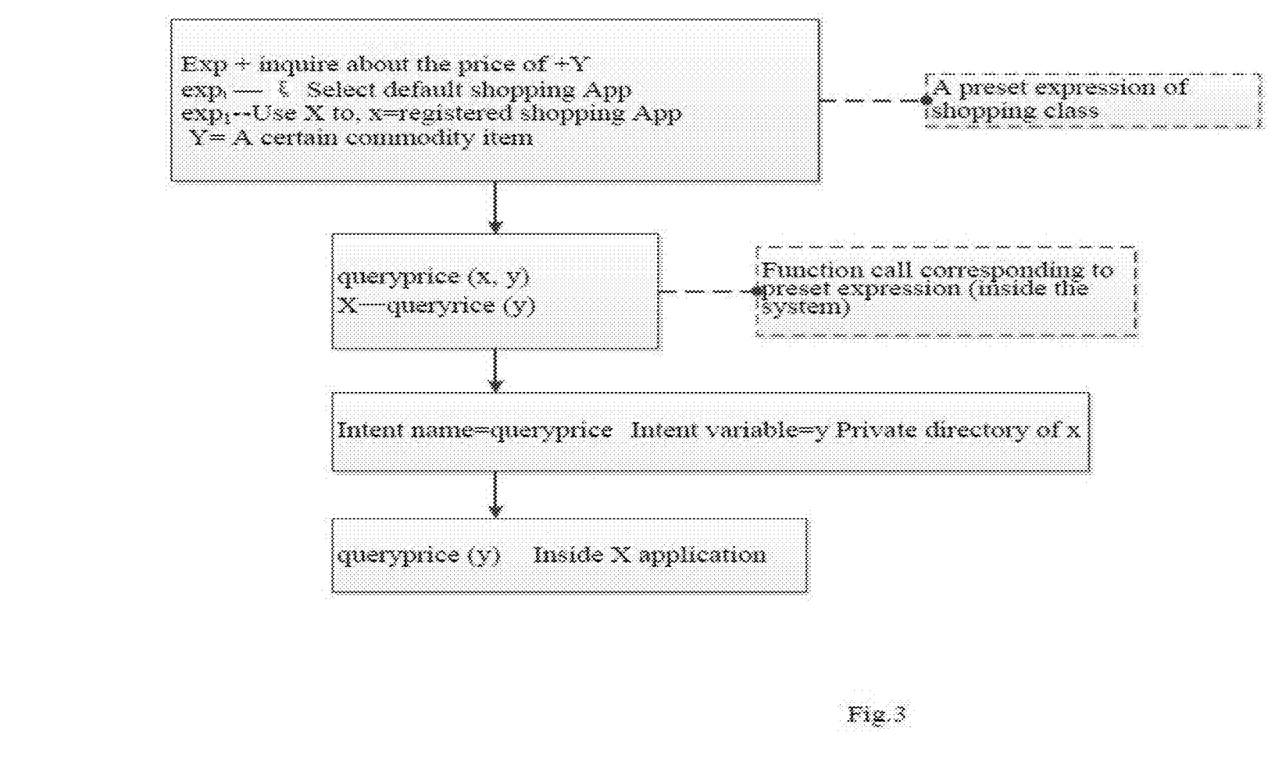
FIG. 3 is a diagram of a shopping application program which executes enquiry function of commodity price.
Figure 4:
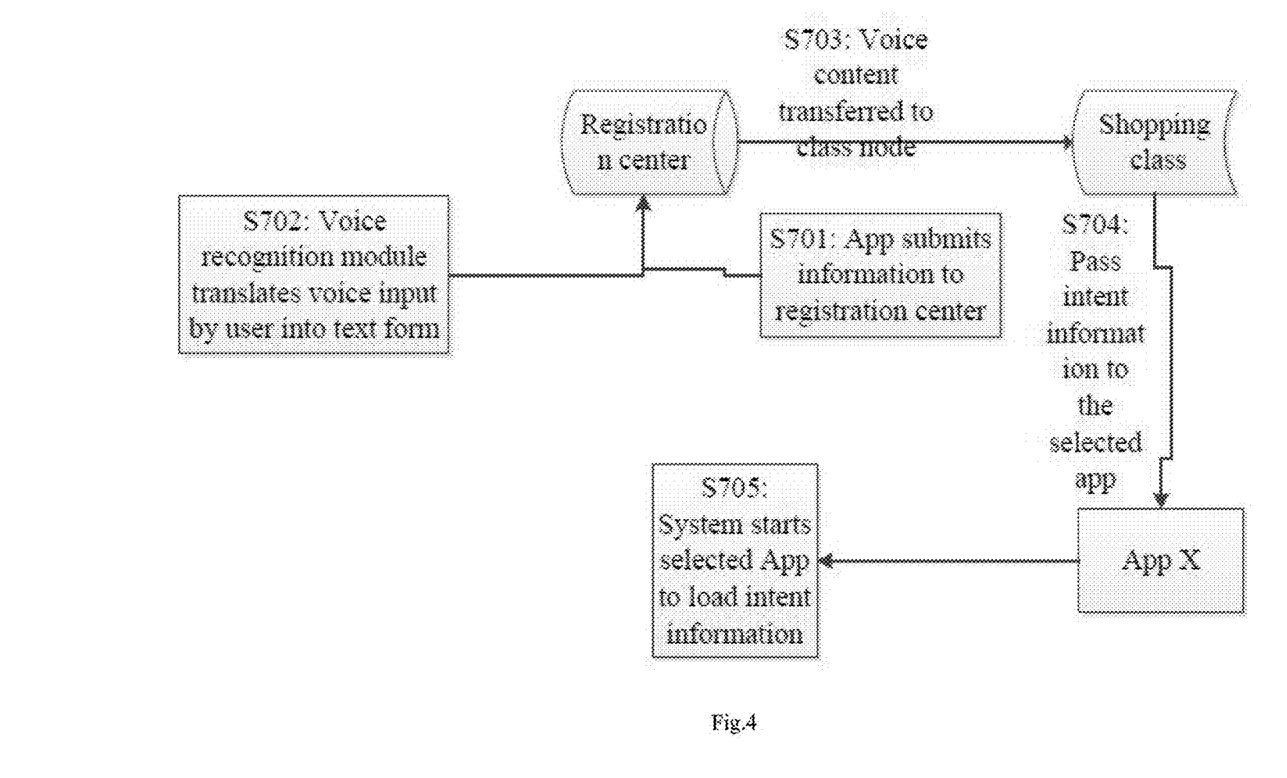
FIG. 4 is a diagram of the shopping application X uses this voice recognition system to interact with the user.

Referring to FIG. 4, a shopping class application program "X" is further described. In order to enable the application X to join the speech recognition system, the developer of the application must set the class information in the application's configuration file. It is assumed here that the public function mapped to the preset expressions of the shopping class is query price(y), so inside the application X the public function query price(y) must be implemented to query the server for the price of the goods input by user. After a user downloads the application X from the application store to the mobile terminal, the application X submits the application name, class information, and identifier to the registration center based on the information stored in the configuration file (S701), this information is added to an application node under the shopping class node. Because the speech recognition system has preset some expressions for the shopping class node, the user can immediately use these expressions to give instructions to the application X. Here assume that the shopping node has a preset expression "Use <appName> to inquire about the price of <name of commodity>". So, if the user says "use x to inquire about the price of iphone8" (refer to FIG. 3), the speech recognition system receives the user's voice input, and the voice recognition module converts the voice into text form (S702); Then the text content obtained from the voice recognition module is passed to all the class nodes. If the text content matches with the preset expression with semantic variables of a class node in the registration center (S703). The speech recognition system selects the application X in light of the variables stored in "appName" and writes the intent name "query price" and intent variables "Y" corresponding to the matching preset expression with semantic variables into the selected application's private directory after the speech recognition system extracts all valuable semantic information from the text content. The intent name is bound to the matching preset expression and corresponds to a constant in a public function inherited from the matching class node, and the intent variables are extracted from the text content output by the voice recognition module and correspond to variables in a public function inherited from the matching class node (S704). The system starts the selected application program, and determines whether the private directory of the selected application program has an intent name and corresponding intent variables or not before loading the selected application program, and wherein if the private directory of the selected application program has the intent name and corresponding intent variables, the selected application program will load the intent name "query price" and corresponding intent variables "y" from the private directory and calls a corresponding public function query price(y) inherited from the matching class node; and wherein if the private directory of the selected application program has no the intent name and corresponding intent variables, a default initial page will be loaded (S705);

The startup program of the application program is found in light of an identifier submitted by the application program X. The application program reads the intent name and intent variables from the application's private directory. The private directory can also be a public storage address specified by the operating system. When the matching preset expressions of the class nodes cannot choose the application programs according to the name of the application programs, if there is only one application belonging to the current class node in the current system, the application is selected as the default application; if the current voice recognition system has at least two application program belonging to the matching class node, the voice recognition system pops up an optional application list, and the user chooses an application program from the optional application list. Of course, some preset expressions include a plurality of semantic variables, the method of the present invention can be implemented as long as the semantic scope of each variable is defined and the preset expressions with variables are mapped to the corresponding functions.

In another embodiment, in order to return the result of a public function call to user, a specific return interface can be set up inside the application program, and the interface will guide the user to the application program internal nodes. For example, inside the query price(y) function, after the application X gets the price information from the server according to a commodity name, the application launches a preset interface and passes the price information to the interface at the end of the function call and asks the user if he likes it. If the user says "dislike", the speech recognition system can send the command "next page" to the application program. In this situation, the "dislike" is a preset expression of the application program internal nodes.

In another embodiment, the preset expressions with semantic variables of the application program internal nodes are automatically generated by the speech recognition system. For example, when the user says the shopping class's preset expression "use<appName> to buy something", the speech recognition system chooses an application program according to the application name input by the user and sends intent information to the selected application program. However, this expression does not provide any specific commodity information, so the selected application program returns a preset result value "value Required" to the speech recognition system in the public function query price(y). Then the speech recognition system reminders the user to input the correct commodity information according to the preset result value. If the user says a correct commodity name, the name will be transmitted to the public function query price(y) again. In this situation, the preset expression of the application program internal node is "<commodity Name>".

In another embodiment, the selected application uses the income intent name as a function name to select the function call inherited from the class nodes (as shown in FIG. 3). However, it should be understood that the intent name can be used as a class name. For example, the public function in FIG. 3 can also be described as Handle(Query price). Queryprice is a class, it has a class name "Query price" and an intent variable "Y". Of course, this class can have multiple intent variables, and each intent variable corresponds to a range of semantics. For example, the expression "I want to buy two white iphone8 at Ebay" can have one intent name and four intent variables. The first intent variable is "buy", it represents the type of transaction. The second intent variable is "two", it represents the number of goods. The third intent variable is "white", it represents the color of the goods. The fourth intent variable is "iphone8", it represents the name of the goods. The corresponding intent name is "Query price". The above intent information can be organized into a single class. So, the intent name is bound to the matching preset expression and corresponds to a constant in a public function inherited from the matching class node, and the intent variables are extracted from the text content output by the voice recognition module and correspond to variables in a public function inherited from the matching class node. Because the class node's preset expressions are provided by the speech recognition system and the message that each intent variable represents is clear, in most cases the application does not need to continue resolving to extract semantic information after it acquires the intent variables.

In other embodiments, the class nodes can comprises one or more preset expressions, the preset expressions are correspondingly mapped one or more function calls. Wherein one function can be mapped to more public functions. For example, the process of dealing with incoming parameters can be divided into three phases, each corresponding to a different public function. So the Handle(Query price) function can be further broken down into three functions: resolve (Query Price), confirm (Query Price), handle (Query price). The resolve(Query price) function is responsible for resolving incoming parameters to see if the parameters are valid. The confirm(Query Price) function is responsible for confirming the account information entered by the user. The handle(Query Price) function is responsible for the implementation of specific operations based on the parameters entered by the user. Of course, the way of dividing functions is not limited to the above.

In another embodiment, developers of the third-party application programs can set the preset expressions with semantic variables in configuration files, and map the preset expressions to preset function call inside the application programs;

For example, the preset expression in the configuration files of Facebook is set as "climbing mountain using the Facebook", the intent name corresponding to the preset expression is set as "sport", and the value of the intent variable is "climb". When the user says the preset expression, the intent name "sport" and the variable value "climb" are sent to the Facebook, the function call corresponding to the intent name "sport" is executed after the Facebook starts. The called function can be a public function inherited from a certain class node or can be customized by the application program.

In another embodiment, the preset expressions of the application program nodes can be automatically generated by the speech recognition system according to data submitted by the user. For example, after a chat application uploads the contact information of an user to the registration center, the user can have the chat application execute the relevant instructions without specifying the chat application's name. Now suppose a chat application A has a contact named "Jack" and another chat app B has a contact named "Colton." The user can say the class node's instruction "send a message to <contact> with <appName>" to send a message using chat application A or B. As an alternative, the user can say the instruction "send a message to Jack" directly, then the chat application A is chosen. Correspondingly, the user can also say "send a message to Colton" directly, then the chat application B is chosen.

In many embodiments, the speech recognition system can be described as a speech recognition system based on third-party applications. The speech recognition system comprising:

a voice recognition module, converting voice content into text form; applications, which are third-party applications downloaded from an application store which join the speech recognition system by declaring a class node to which it belongs and inheriting the public function set of the class node; the class nodes are classified by intent, each class node stores preset expressions with semantic variables that describe common behaviors of a series of application programs, and these preset expressions are mapped to a public function set, wherein the preset expressions of class nodes specify an application to be launched according to the name of the application, the manner in which the application interacts with the user through the speech recognition system at least comprises:

after the voice input by the user is converted into text form by the voice recognition module, when the obtained text content matches the preset expression with semantic variables of a class node, the system selects an application according to the name of the application and writes an intent name and corresponding intent variables into the selected application's private directory and starts the selected application, wherein the speech recognition system determines whether the private directory of the selected application program has an intent name and corresponding intent variables or not before loading the selected application, and wherein if the private directory of the selected application program has the intent name and corresponding intent variables, the selected application program will load the intent name and corresponding intent variables from the private directory and calls a public function inherited from the matching class node; and wherein if the private directory of the selected application program has no the intent name and corresponding intent variables, a default initial page will be loaded, wherein, the intent name is bound to the matching preset expression and corresponds to a constant in a public function inherited from the matching class node, and the intent variables are extracted from the text content output by the voice recognition module and correspond to variables in a public function inherited from the matching class node.

In other embodiments, the speech recognition system can set priority for an application that belongs to a class node and inherits the public function set of the class node. In this case, if the matching preset expression with semantic variables does not specify an application name, the system selects an application that belongs to the matching class node with the highest priority; wherein, the manner of setting the priority of the application may include one or more of the following:

First, users configure the priority of the application autonomously in the system settings interface; the system displays all applications installed in this device at the system settings, which are classified by intention, you can set up your favorite application.

Second, depending on the number of times an application is used, the application that is most frequently used is set to the highest priority;

Third, the priority is set according to the place where the application is used. The system records the location information when the application is used. The application that is used most frequently in an area is set to the highest priority in the area. Now assume that you have two lighting applications installed on your mobile phone. Application A controls the lamp in your bedroom, and application B controls the lamp in your office. When you are at home, you will use the application A to turn on the lights. When you are in the office, you will use the application B to turn on the lights. The system recorded the class information of these two applications and the places where these applications are opened. So, when you're at home, you just need to say "turn on the lights" and the application A executes the public function inherited from the lighting class node to turn on the lights. Accordingly, when you say this instruction in the office, the application B executes the public function inherited from the lighting class node to turn on the lights.

Figure 5:
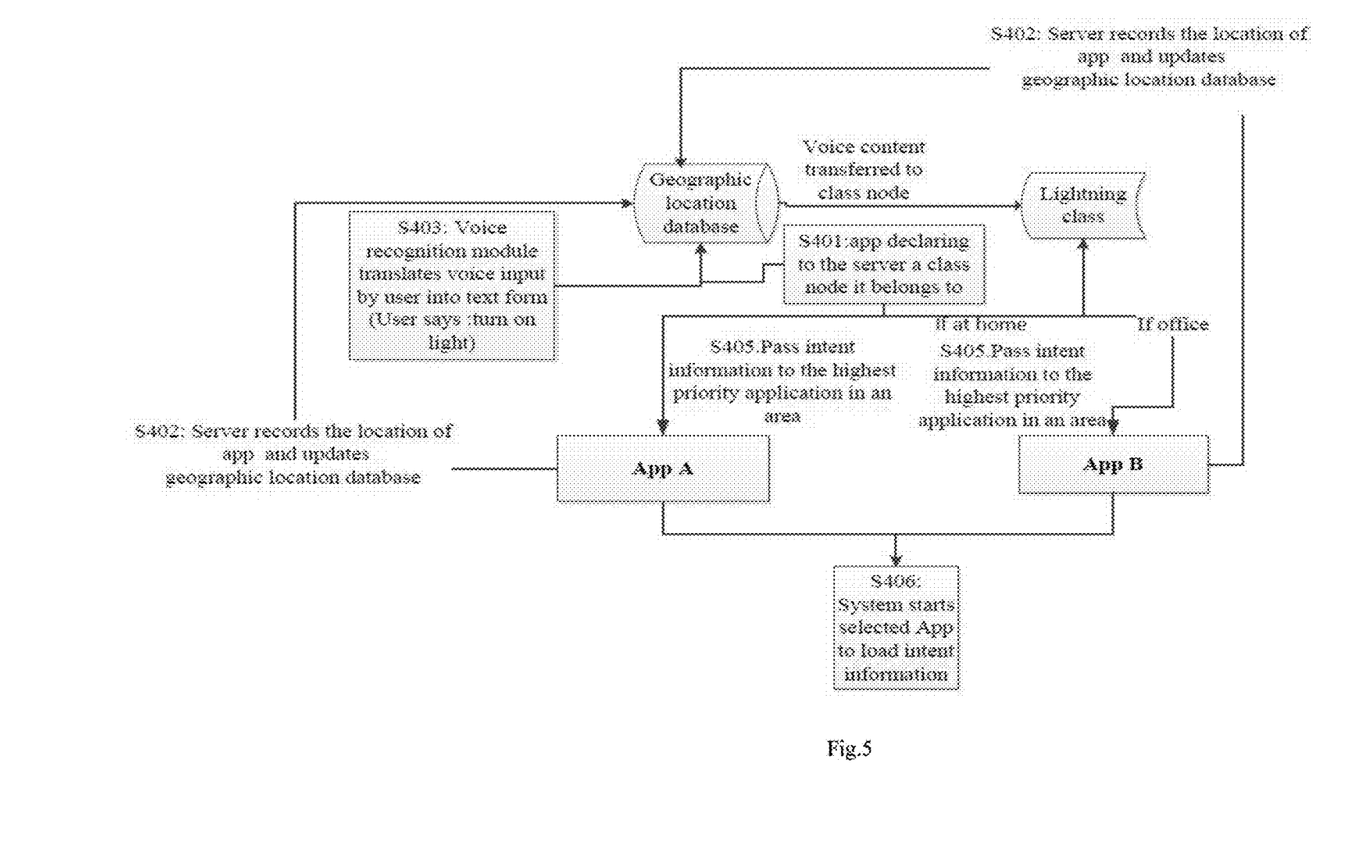
FIG. 5 a flow chat of a method for providing personalized service to users based on address information.

The method of setting the application program priority based on the geographic location of the application program comprise:

Refer to FIG. 5, the application declares to the server a class node it belongs to (lightning class node), the class node is related to geographical location (S401). When the user uses the application, the server records the geographic location of the application when it is used and updates the application information in the geographic location database. When the number of times the application is used exceeds the preset threshold in an area, the system marks the application as an optional application in this area, and the application with the highest usage number becomes the highest priority application in this area (S402). The system will record how many times you have used applications A and B at the office and at home, and the relevant location information. The user enters a preset expression without an application name using voice, the preset expression is preset by a class node associated related to geographical location ("turn on the light"). The voice recognition system receives voice input by a user, and the voice recognition module converting voice into text form (S403). The text content obtained from the voice recognition module is transmitted to all the class nodes (S404). If the text content matches with the preset expressions with semantic variables of a class node in the registration center, the system selects the application with the highest priority according to the user's current location and writing the intent name and intent variables corresponding to the matching preset expression with semantic variables into a private directory of the selected application program installed on the system (If you often turn on the light using app A at home, the system records this information and will select A when you issue a command at home.), wherein, the intent name is bound to the matching preset expression and corresponds to a constant in a public function inherited from the matching class node, and the intent variables are extracted from the text content output by the voice recognition module and correspond to variables in a public function inherited from the matching class node (S405). The system starting the selected application program, wherein the speech recognition system determines whether the private directory of the selected application program has an intent name and corresponding intent variables or not before loading the selected application program, and wherein if the private directory of the selected application program has the intent name ("turnLight") and corresponding intent variables (there is no variable here, so is " "), the selected application program will load the intent name and corresponding intent variables from the private directory and calls a corresponding public function ("turnLight( )") inherited from the matching class node (S406).

The technology solution described above is applied to mobile devices, such as IOS and Android, but also suitable for web search and intelligent home voice management. When the technology solution is used to search the web, a module is built for the semantics recognition of each web page. After an input voice content matches with a preset expression, an operation of a web page is called. If more than one web site matches with the input content, the results from the matching function of these web sites are aggregated to a web page.

The intelligent home voice management can make devices in a dormant period when they are not working, the devices are started when the relevant device can perform the operation asked by the user. The present invention can make a new equipment and a new website to be easily added into the existing voice recognition system.

In all embodiments, the applications described above can be interpreted as third-party applications downloaded from a third-party application store unless otherwise specified. In some cases, because the speech recognition system described in the present invention is deeply integrated with the third-party applications, the speech recognition system can be regarded as a complete operating system, which includes applications installed on the operating system. In other cases the speech recognition system can also be seen as part of the operating system, but it does not include applications installed on the operating system. The above two descriptions does not affect the understanding of the present invention.

If the speech recognition and resolution ability of the device is limited, the registration center will be put into the cloud server. The identifier of the application program will represent the URL address of the application program. The operating system of the present invention can be a local operating system, and can also be a cloud operating system where these application programs are installed in different physical locations.

By way of layering the system, a general semantic recognition operation for the system is separated from a specific semantic recognition for the application programs, and by way of classifying the application programs and abstracting out some common functions, the system can find the application program matching the voice content semantics very efficiently and a third-party application can be easily added into the existing voice recognition system. The present invention maps a common performance function to many preset expression with semantic variables, so that the system can recognize more personalized expressions with the optimization of the semantic recognition. Therefore, the system can show more humanized characteristics.

The present invention provides a voice recognition system and its construction method that can write the recognized intent information into the private directory of an application program built by the speech recognition system, so that the application program does not occupy the thread when the speech recognition system recognizes the voice content. It can also prevent the input voice content from being tapped by other threads.

The embodiments described above are merely preferred ones of the present disclosure but are not limitations to the protection scope of the present disclosure, and any variations or substitutions easily devised by those skilled in the art without departing from the spirit of the present disclosure fall within the scope of the protection. Therefore, the protection scope of the present disclosure shall be subject to that specified by the appended claims.

The invention claimed is:

1. A voice recognition system, comprising:
   a registration center storing information of application programs installed on the voice recognition system; wherein the registration center comprises:
   class nodes classified by intent, each class node storing preset expressions with semantic variables which describe common behaviors of a series of application programs, and the preset expressions are mapped to a first public function set;
   the voice recognition system further comprising:
   the application programs, each of the application programs joining the registration center by declaring a first class node which is one of the class nodes to which each of the application programs belongs and inheriting a second public function set of the first class node; each of the application programs is a third-party application program downloaded from an application store; and
   a voice recognition module converting first voice input by a user into first text content; the voice recognition system selects a selected application program which is one of the class nodes to process information obtained from the first text content output by the voice recognition module;
   when the first text content output by the voice recognition module matches with a first preset expression with semantic variables of a matching class node which is one of the class nodes in the registration center, the voice recognition system selects the selected application program belonging to the matching class node and writes a first intent name and first intent variables into a private directory of the selected application program, the selected application program selects and executes a third public function inherited from the matching class node based on the first intent name and the first variables after the selected application program is started; the first intent name is bound to the first preset expression with semantic variables and corresponds to a constant in the third public function inherited from the matching class node; and the first intent variables are extracted from the first text content output by the voice recognition module and correspond to variables in the third public function inherited from the matching class node; wherein when the first text content output by the voice recognition module matches with the first preset expression with semantic variables of the matching class node in the registration center, manners in which the voice recognition system selects the selected application program include:
   if the first preset expression with semantic variables specifies an application name, the voice recognition system selects the selected application program according to the application name.

2. The voice recognition system according to claim 1, wherein when the first text content matches with the first preset expression with semantic variables of the matching class node in the registration center, the manners in which the voice recognition system selects the selected application program further comprises:
   if the first preset expression with semantic variables does not specify the application name, the voice recognition system selects a default application program that belongs to the matching class node as the selected application program.

3. The voice recognition system according to claim 2, the registration center further comprises application program nodes; and each of the application program nodes represents one of the application programs and stores preset expressions with semantic variables that are not used in the class nodes of the registration center, and the preset expressions are mapped to a first specific function set inside the application programs, if the first text content obtained from the voice recognition module matches with a second preset expression with semantic variables of one of the application program nodes, one of the application programs represented by the application program node is started by the voice recognition system and calls a second specific function to which the second preset expression is mapped.

4. The voice recognition system according to claim 3, wherein the registration center further comprises application program internal nodes; and each of the application program internal nodes stores preset expressions with semantic variables that are used in one of the application programs and corresponding function calls, after entering the selected application program, the voice recognition system processes the user's voice input in following manner:

the voice recognition module converts second voice into second text content, the voice recognition system validates whether the second text content matches with a third preset expression with semantic variables of one of the application program internal nodes, if they match, the voice recognition system executes a corresponding function call; otherwise, the second text content is passed to all the class nodes, if the second text content matches with a third preset expression with semantic variables of a first class node which is one of the class nodes, the voice recognition system selects a second application program which is one of the class nodes that belongs to the first class node to be started and passes a second intent name and second intent variables to the second application program, the second application program calls a fourth public function inherited from the first class node based on the second intent name after the second application is started, wherein, the second intent name is bound to the third preset expression and corresponds to a constant in the fourth public function inherited from the first class node, and the second intent variables are extracted from the second text content output by the voice recognition module and correspond to variables in the fourth public function inherited from the first class node.

5. The voice recognition system according to claim 1, wherein when the first text content matches with the first preset expression with semantic variables of the matching class node in the registration center, the manners in which the voice recognition system selects the selected application program further comprises:

if the first preset expression with semantic variables does not specify the application name, the voice recognition system selects each of the application programs that belongs to the matching class node as the selected application program.

6. The voice recognition system according to claim 1, wherein the class nodes of the registration center are related to geographical location, and each of the application programs has a priority, the voice recognition system records the number of times each of the application programs is used and the geographical location where the user is located when each of the application programs is used, a first application program which is one of the application programs that is used most frequently in a certain area obtains the highest priority in this area; the manners in which the voice recognition system selects the selected application program further comprises:

if the first text content obtained from the voice recognition module matches with the first preset expression of the matching class node, but the first preset expression with semantic variables does not specify the application name, the voice recognition system selects the first application program as the selected application program.

7. A method for constructing a voice recognition system, the voice recognition system comprises a voice recognition module and a registration center, the registration center is configured to store information of application programs installed in the voice recognition system, the application programs are third-party applications downloaded from an application store, the registration center further comprising: class nodes classified by intent, each class node stores preset expressions with semantic variables which describe common behaviors of a series of the application programs, and the preset expressions are mapped to a first public function set; wherein the construction method comprising:

S701, each of the application programs that belongs to a first class node which is one of the class nodes and inherits a second public function set of the first class node submitting information to the registration center;

S702, the voice recognition system receiving first voice input by a user, and the voice recognition module converting voice into first text content;

S703, transmitting the first text content obtained from the voice recognition module to all the class nodes, if the first text content matches with a first preset expressions with semantic variables of a matching class node which is one of the class nodes in the registration center, S704 is performed;

S704, the voice recognition system selecting a selected application program which is one of the application programs and writing a first intent name and first intent variables corresponding to the first preset expression with semantic variables into a private directory of the selected application program installed on the voice recognition system, wherein, the first intent name is bound to the first preset expression and corresponds to a constant in a third public function inherited from the matching class node, and the first intent variables are extracted from the first text content output by the voice recognition module and correspond to variables in the third public function inherited from the matching class node;

S705, the voice recognition system starting the selected application program, the selected application program calls the third public function inherited from the matching class node according to the first intent name and the first intent variables stored in the private directory of the selected application program;

wherein manners for selecting the selected application program in step S704 include:

If the first preset expression with semantic variables specifies an application name, the voice recognition system selects the selected application program according to the application name.

8. The method for constructing the voice recognition system according to claim 7, wherein the information submitted in step S701 includes a name and an identifier of each of the application programs, class information of each of the application programs.

9. The method for constructing the voice recognition system according to claim 8, wherein the manners for selecting the selected application program in step S704 further comprises:
   if the first preset expression with semantic variables does not specify the application name, the voice recognition system selects a default application program that belongs to the matching class node as the selected application program.

10. The method for constructing the voice recognition system according to claim 9, wherein the registration center further comprises: application program internal nodes; wherein each of the application program internal nodes stores preset expressions with semantic variables that are used in one of the application programs and corresponding function calls.

11. The method for constructing the voice recognition system according to claim 10, wherein after entering the selected application program in step S705, the voice recognition system processes the user's voice input in following manner:
   the voice recognition module converts second voice into second text content, the voice recognition system validates whether the second text content matches with a second preset expression with semantic variables of one of the application program internal nodes, if they match, the voice recognition system executes a corresponding function call, otherwise the second text content is passed to all the class nodes, if the second text content matches with a third preset expression with semantic variables of a second class node which is one of the class nodes, the voice recognition system selects a second application program which is one of the application programs that belongs to the second class node to be started and passes an second intent name and second intent variables corresponding to the third preset expression with semantic variables to the second application program, the second application program calls a fourth public function inherited from the second class node based on the second intent name after the second application is started, wherein, the second intent name is bound to the third preset expression and corresponds to a constant in the fourth public function inherited from the second class node, and the second intent variables are extracted from the second text content output by the voice recognition module and correspond to variables in the fourth public function inherited from the second class node.

12. The method for constructing the voice recognition system according to claim 8, wherein the manners for selecting the selected application program in step S704 further comprises:
   if the first preset expression with semantic variables does not specify the application name, the voice recognition system selects each of the application programs that belongs to the matching class node as the selected application program.

13. A voice recognition system comprising: a voice recognition module, converting first voice into first text content; and class nodes classified by intent, each class node storing preset expressions with semantic variables which describe common behaviors of a series of application programs, the preset expressions are mapped to a first public function set; and the application programs, each of the application programs joining the voice recognition system by declaring a first class node which is one of the class nodes to which each of the application programs belongs and inheriting a second public function set of the first class node; wherein the application programs are third-party application programs downloaded from an application store; manners in which the application programs interact with a user through the voice recognition system includes:
   after voice input by the user is converted into first text content by the voice recognition module, when the first text content matches with a first preset expression with semantic variables of a matching class node which is one of the class nodes, the voice recognition system selects a selected application program which is one of the application programs according to an application name and writes an first intent name and first intent variables into a private directory of the selected application program and starts the selected application program, the selected application program loads the first intent name and first intent variables from the private directory and calls a second public function inherited from the matching class node; wherein, the first intent name is bound to the first preset expression and corresponds to a constant in the second public function inherited from the matching class node, and the first intent variables are extracted from the first text content output by the voice recognition module and correspond to variables in the second public function inherited from the matching class node.

14. The voice recognition system according to claim 13, wherein, the manners in which the application programs interact with the user through the voice recognition system further include: after the first voice input by the user is converted into the first text content by the voice recognition module, when the first text content matches with a second preset expression with semantic variables specific to a second application program which is one of the application programs, the second application program is selected and passed into a second intent name and second intent variables, after the second application program is started, the second application program calls a third function according to the second intent name and second intent variables.

15. The voice recognition system according to claim 14, wherein, after the selected application program is started, the manners in which the application programs interact with the user through the voice recognition system further include: after second voice input by the user is converted into second text content by the voice recognition module, the selected application program executes a fourth function call if the second text content matches with a third preset expression with semantic variables used in the selected application program.

* * * * *